United States Patent [19]

Stokkendal

[11] Patent Number: 4,728,244
[45] Date of Patent: Mar. 1, 1988

[54] COMBINED ROOF RACK FOR A CAR AND TWO-WHEEL CART

[76] Inventor: Svend Stokkendal, Slependveien 8, N-1300 Sandvika, Norway

[21] Appl. No.: 827,052

[22] Filed: Feb. 7, 1986

[30] Foreign Application Priority Data

Jul. 5, 1985 [NO] Norway .................. 852732

[51] Int. Cl.⁴ .................................... B60R 9/04
[52] U.S. Cl. ............................ 414/462; 224/319; 248/231.2
[58] Field of Search ................ 224/42.03 B, 319; 280/7.12, 269, 47.24, 80 R; 414/462; 248/231.2; 211/17; 292/153; 180/208, 209

[56] References Cited

U.S. PATENT DOCUMENTS

| | | | |
|---|---|---|---|
| 2,551,351 | 5/1951 | Swenson | 414/462 |
| 2,674,463 | 4/1954 | Peterson | 280/80 R |
| 2,967,635 | 1/1961 | Barnett | 414/462 |
| 3,229,838 | 1/1966 | Johnson | 414/462 |
| 3,901,421 | 8/1975 | Kalicki et al. | 211/17 X |
| 3,927,779 | 12/1975 | Johnson | 414/462 |
| 4,576,389 | 3/1986 | Villaveces et al. | 280/47.24 X |

FOREIGN PATENT DOCUMENTS 2397503  3/1979  France .................. 292/153

Primary Examiner—Frank E. Werner
Assistant Examiner—Janice Krizek
Attorney, Agent, or Firm—Mason, Fenwick & Lawrence

[57] ABSTRACT

A combined car roof rack and two-wheel cart comprising two bars which are adapted to run across the top of the car. Each bar is provided at one end thereof with a rotatable roller which faces into the opening between the bars. On the two rollers, between the bars, there is mounted a rack frame whose two opposing frame elements have a C-form and engage with the rollers. For the frame elements having C-profiles there are provided mountable and dismountable service wheel devices, and for the rack frame there is provided a shaft which is capable of being swung from a position folded in under the rack frame to a position extending from the end of the rack frame near the rollers, which shaft serves as a support leg for the rack frame when this has been drawn out and over the side of the car top and swung down along the one side of the vehicle.

4 Claims, 19 Drawing Figures

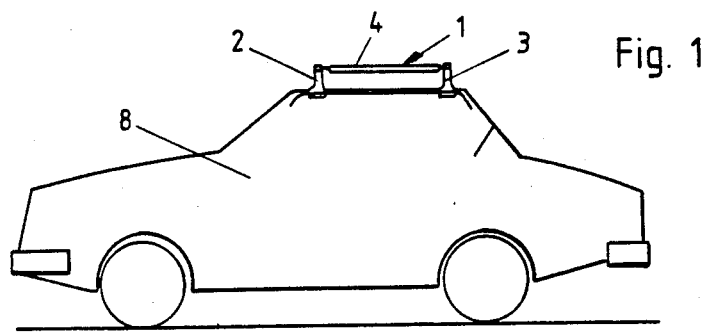
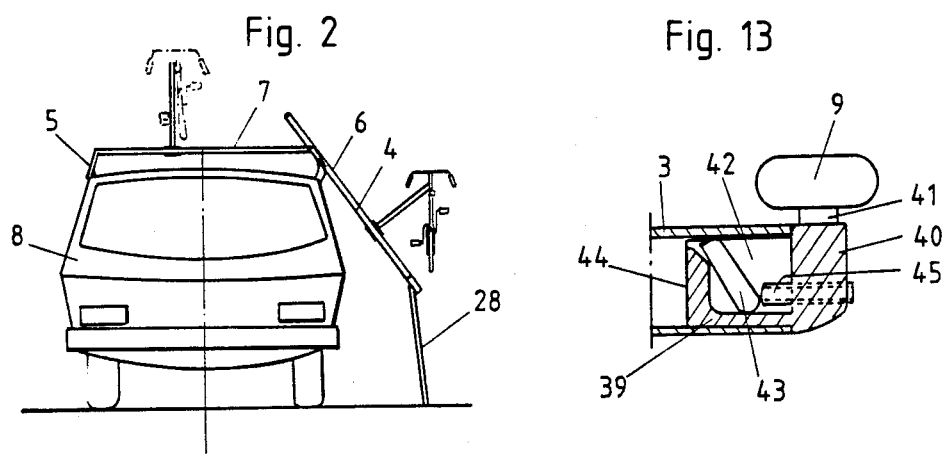
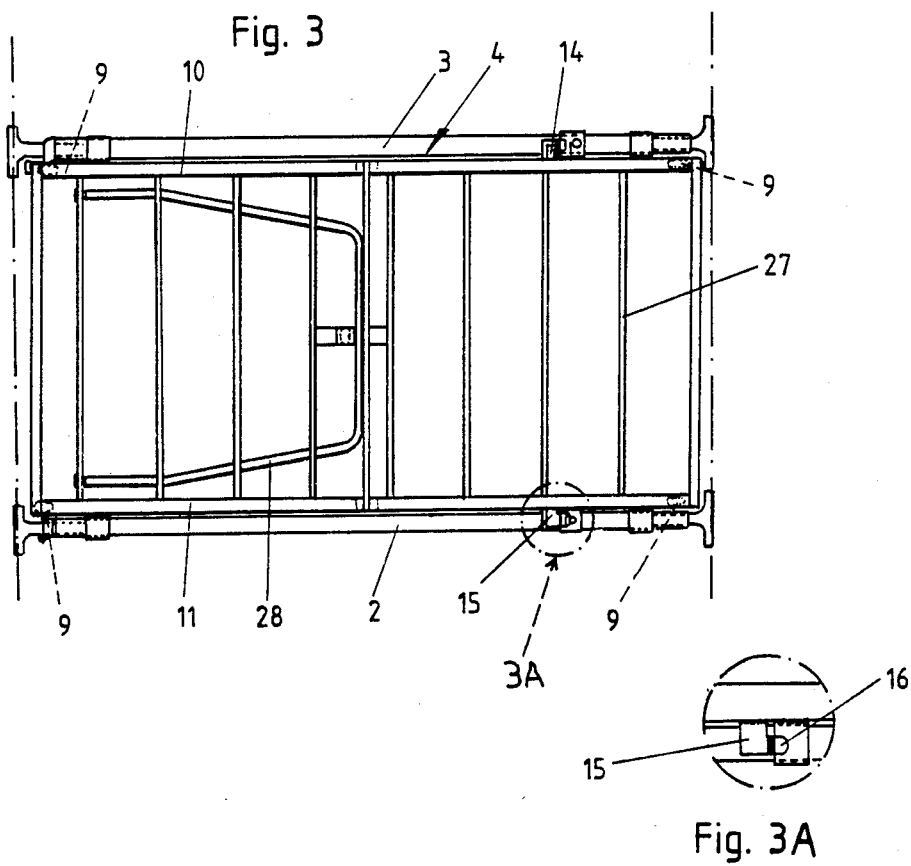

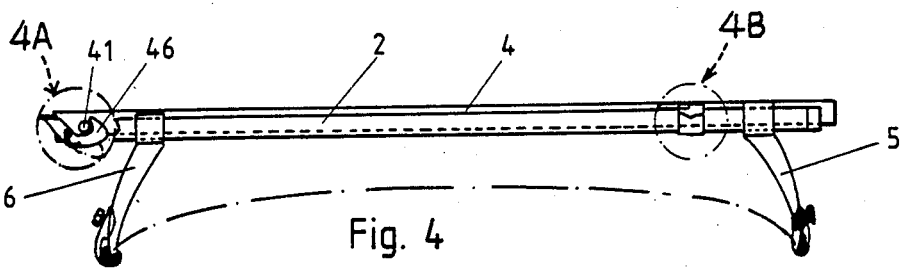
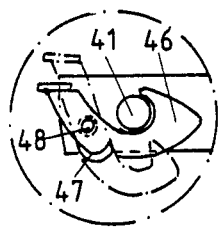
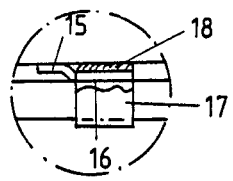
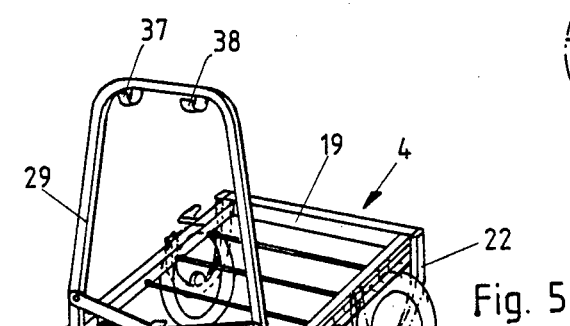
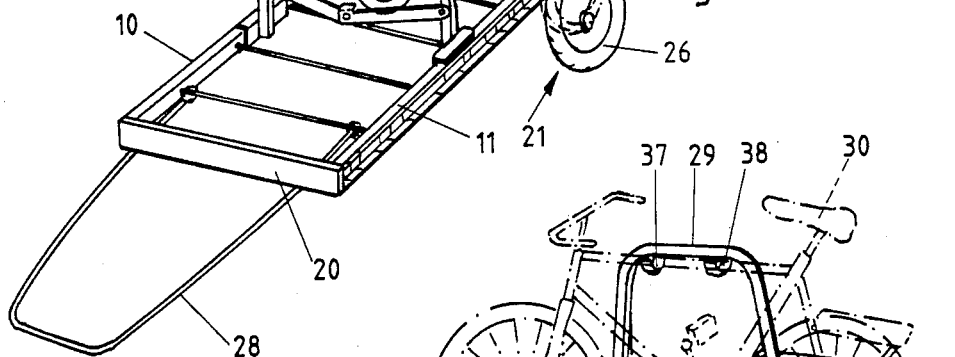
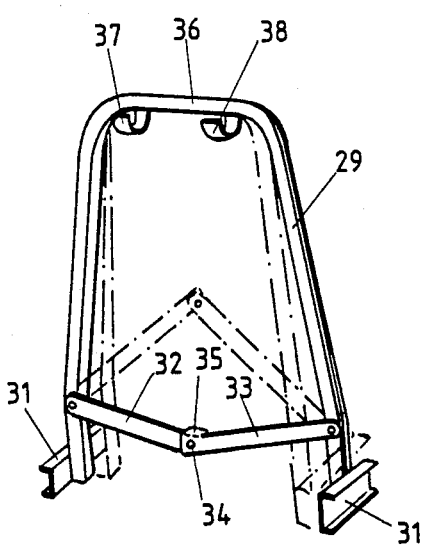
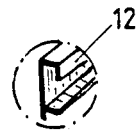

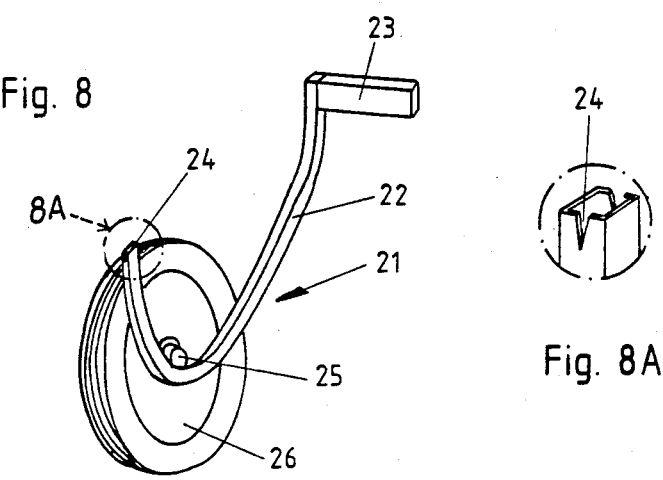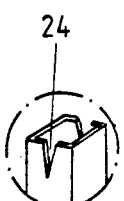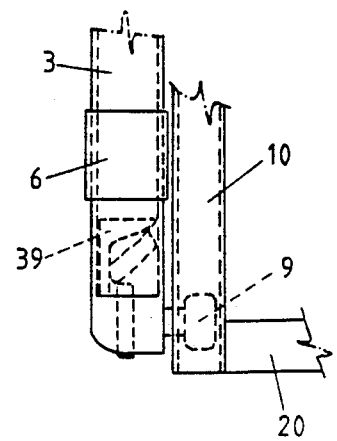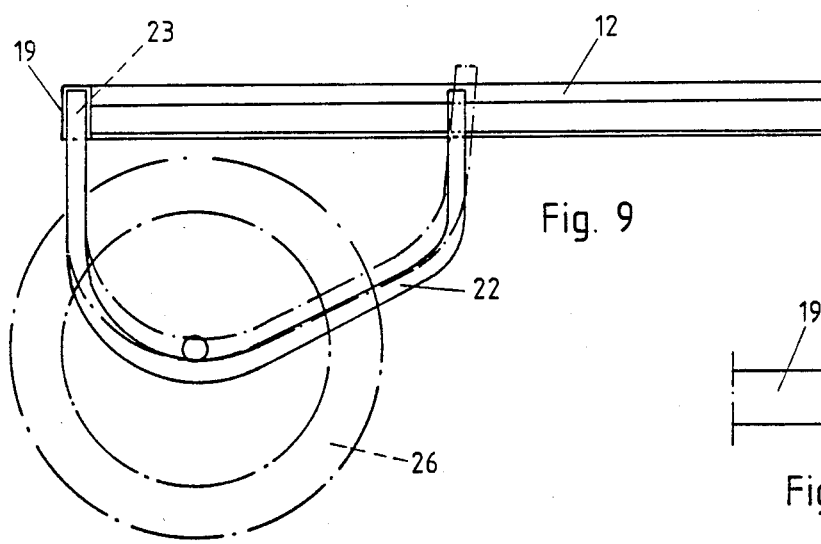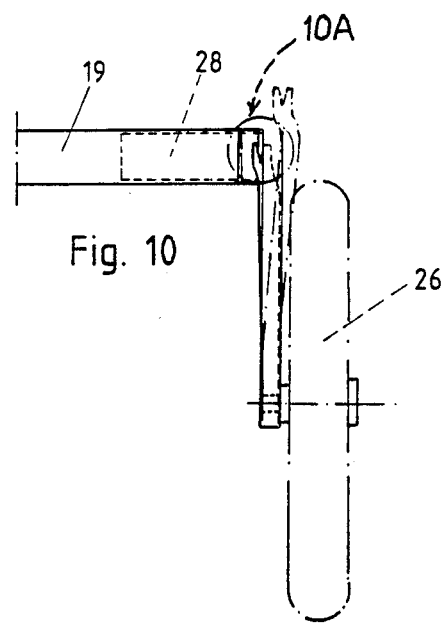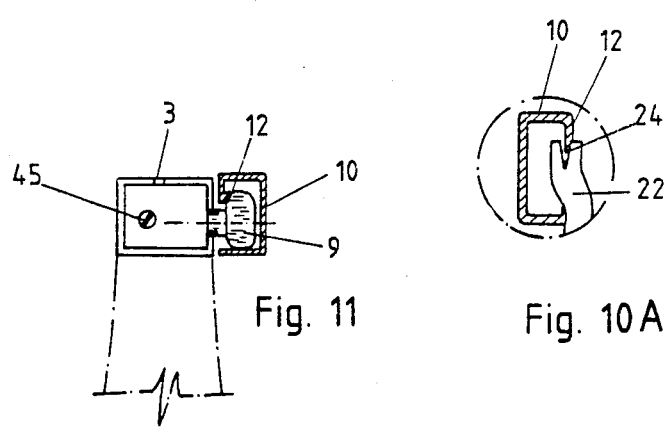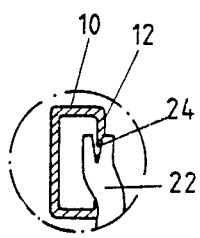

COMBINED ROOF RACK FOR A CAR AND TWO-WHEEL CART

This invention relates to a combination of a roof rack for a car and a two-wheel cart comprising two bars adapted to be attached to the top of a car, so that they run in spaced parallel relationship to one another over the roof of the car transversely to its longitudinal direction, said bars being provided at one end with a rotatable roller whose axis runs transversely to the longitudinal direction of the bar, and wherein a rectangular rack having at least one attachment bar for the fastening of baggage, particularly a bicycle, is moveably mounted between the bars, there being two opposing frame elements running parallel with and close up to the bars, and consisting of metal lengths having a C-profile, e.g., aluminum profile lengths, with their profile openings facing their respective bars and in engagement with the rollers thereof.

Such a roof rack for a car is known from Norwegian Pat. No. 143483.

By arranging a roof rack in this manner, the rack can be moved across the top of the car. Because the wheels are blocked at the one end of the transverse bars, that is, at the one edge of the car top, the frame may be drawn out to the side of the car and swung downwards, so that the rack is suspended down along the side of the car. The baggage may then easily be fastened to the rack in this position. It is thus not necessary to lift heavy or unmanageable parcels up onto a car rack which is permanently attached to the car top. Bringing the rack onto the car top is quite simple and easy. One lifts the rack up and at an incline, inwards over the car top, with an appropriate lifting motion using a straight back. When the rack has been moved a bit upwards and inwards over the car, part of the baggage weight will contribute positively to the leverage relative to the rollers forming a fulcrum for the weight balance of the rack.

There will often be a need for further transport from the roadway. Such a need might arise, for example, if one is to transport a small boat from the roadway down to a beach, to carry baggage or other goods from the roadway into a cabin, or the like. It would then be very useful to have a small cart for this transport.

The object of the present invention is to provide instruction for designing a combination of a roof rack for a car and a two-wheel cart. In addition, the invention provides an improvement upon the existing above-described roof rack, as well as details connected with the conversion of the roof rack to a cart.

This is achieved according to the invention essentially by means of the roof rack described in the introduction above, which is characterized by provision of easily mountable and dismountable service wheel devices for each of the two C-profile frame elements, and by provision of a shaft for the rack which is capable of being swung out from its position folded in under the rack to a position extending from the end of the rack near the rollers, which shaft serves as a support for the rack when it has been drawn out and over the side of the car top and swung down along the one side of the vehicle.

A further feature of the invention is that each of the two service wheel devices consists of a flexible, approximately U-shaped bar where the wheel is rotatably attached on a shaft journal mounted in the bar between the ends thereof, that there is provided on the one end of the bar a pin projecting at a right angle to the main plane of the bar, adapted for engagement with a complementary opening in the side of the frame, in particular the open ends of two frame elements of profile tubing which run transversely to the frame elements of C-profile, and that the other end of the bar has a slot opening upwardly and adapted to engage with the downwardly directed flange of the element of the C-profile when the service wheel devices are in mounted position.

The invention will be more fully explained in the following, with reference to the drawings, wherein FIG. 1 shows a diagram of a vehicle with a roof rack according to the invention, seen from the side, FIG. 2 shows the roof rack in lowered position alongside the car, FIG. 3 shows the roof rack with attachment bars seen from above, FIG. 4 shows the roof rack with attachment bars seen from the front, FIG. 5 shows the roof rack dismounted from the vehicle top and with the service wheel device, FIG. 6 shows the same as FIG. 5, but with the service wheel devices dismounted, FIG. 7 shows a bar for attachment of baggage, seen in perspective, FIG. 8 shows in perspective a service wheel device according to the invention, FIG. 9 shows the service wheel device seen from the side, in mounted position, with a portion of the roof rack frame, FIG. 10 shows the service wheel device seen from the front, again in mounted position and showing a portion of the rack frame, FIG. 11 shows the end of an attachment bar with a roller, and with a rack frame element in engagement therewith, FIG. 12 shows the end of a bar with a roller which is mounted in a special holder, seen from above, FIG. 13 shows a cross-section through the roller holder and the end of the attachment bar, and FIGS. 3A, 4A, 4B, 6A, 8A, and 10A, show enlarged details of the structure indicated by the broken line circles in FIGS. 3, 4, 6, 8 and 10.

FIGS. 1 and 2 illustrate diagrammatically how the rack 1 functions. The rack consists of two bars 2 and 3 and a moveable rack frame or baggage carrier 4. Each of the transverse bars 2 and 3 consists of two brackets 5 and 6 and a solid cross beam 7. The brackets 5 and 6 are of a type which can be fastened to the rain gutter 8 of a vehicle. The rack frame 4 is moveably mounted relative to the crossbars 2 and 3, as shown in FIGS. 1 and 2.

Provided at one end of each of the crossbars is a roller 9. The rollers 9 in the two crossbars 2 and 3 lie directly opposite one another and point inwards into the space between the two crossbars. The rollers 9 are attached to the crossbars in a manner to be explained in more detail below.

The two rollers 9 engage the two opposing sides 10 and 11 of the rack frame 4. The two sides of the frame consist of lengths of metal having approximately a C-profile opening outwards. The profile is apparent from FIG. 11 and the enlarged detail in FIG. 6. As shown, the profile has a flange 12 which is parallel with the longitudinal opening therein, which ensures that the rollers 9 do not slip out of engaged position with the frame members. A portion of the lower flanges of the two frame members 10, 11 is removed at point 13, so that the rollers may be brought into and out of engagement with the frame members for mounting and dismounting, respectively, of the rack frame. To each of the frame members 10 and 11, near the end turned away from the rollers in mounted position, there are welded ears 14 and 15 (see detail in FIG. 3) projecting into the horizontal plane. When the rack frame 4 is in mounted position, these ears will rest upon the bars 2 and 3. Each of the two projecting ears 14 and 15 have extending tongues 16 directed toward the nearest end of the rack frame 4. As is apparent from FIG. 4, in mounted position these tongues 16 are inserted under the upper side 18 of a tube sleeve 17 attached to each of the bars 2, 3 with said upper side 18 being spaced at a slight distance above the bars.

Besides the two frame elements 10, 11, the rack frame consists of two frame elements 19, 20 mounted transversely thereto. These frame elements are made of square tubing, and element 19, at least, has open outside ends. These open tube ends serve as a means of attaching the service wheel device 21 (FIGS. 8, 9, 10). Each of the two service wheel devices consists of a curved bar 22 of square tubing. To the one end of the bar is attached a square pin 23 projecting at right angles to the main plane of the bar. The opposite end of the bar 22 is provided with a slot 24 opening outwardly toward the end. To the bottom of the curve of the bar is welded a shaft journal 25 which pivotably supports a service wheel 26.

When the rack frame 4 is to be used as a cart, the square pins 23 are inserted into the open ends of the frame element 19, as shown clearly in FIGS. 9 and 10. In the position as shown in FIG. 9, with the pin 23 fitted into the open end of the frame element 19, the end of the bar opposite the end having the pin 23 projects slightly above the frame element 10 or 11, as indicated by the broken line. The bar 22 must be bent downwards, under elastic deformation thereof, in order to latch the slot 24 into engagement with the flange 12. This ensures that the service wheel device 21 is held securely in place. The end of the bar 22 having the slot 24 is bent slightly out of the vertical plane, as is clearly apparent from the enlarged detail in FIG. 10, in order to clear the lower flange of the frame element 10 or 11.

Between the frame elements 10 and 11 are mounted a plurality of cross ribs 27 which serve to support the baggage. To one of these is attached the ends of a bar 28. When the rack frame is in the position where it has been slid in over the top of the vehicle, the bar 28 is securely locked to the underside of the rack, as shown in FIG. 3. When the rack 4 is pulled out and swung down to the side of the vehicle, as shown in FIG. 2, the bar 28 is swung out to form an extension of the rack and serves as a support leg. When the rack is converted to a cart, as shown in FIGS. 5 and 6, the bar 28 in its open position serves as a shaft.

Onto the rack frame may be attached one or more bars 29 on which to fasten baggage, e.g., a bicycle 30. At the ends of the legs of the bar, on the outside thereof, there are attached short profile sections 31 with the opening of the profile facing outwards. To each of the legs of the bar is articulately attached a jointed arm 32 and 33, the two arms at their inwardly directed ends being articulately attached to one another by means of a point 34. By drawing the arms upwards to the position indicated by the broken dotted lines, the legs of the bar will be drawn inward, so that the profile sections 31 can be inserted down between the frame elements 11. By pressing thereafter the jointed arms 32 and 33 downwards to the position indicated by unbroken lines in FIGS. 5, 6 and 7, the legs of the bar will be forced apart and the profile sections 31 will be pressed into firm contact with the frame elements 10, 11. In this position, the jointed arms 32 and 33 are in an overcentered position and are prevented from further downward movement by a flattened tongue element 35 on the arm 33 which will press down on the upper edge of the jointed arm 32. To the upper horizontal section 36 of the bar 29 are fastened two hooks 37 and 38. When a bicycle 30 is to be attached to the rack, the rack is swung down to a position as shown in FIG. 2 and the bicycle is hung on the hooks 37 and 38 as shown in FIG. 6, and is suspended therefrom with its lower part against the bar 29 and is securely fastened to the bar or to the jointed arms 32, 33 by means of an elastic strap or the like. Other baggage may also be attached to and supported against one or several of such bars 29.

FIGS. 11, 12, and 13 show a special attachment means for the rollers according to the invention. In the one open end of each of the crossbars 2 and 3, there is inserted a plug 39 which extends with its free end 40 slightly beyond the end of the bar. To this exposed free end, at an angle thereto, is fastened a shaft journal 41 which pivotably supports the roller 9. Within the plug is provided a cavity 42 in which is disposed a moveable lock piece 43. The lock piece 43 leans inwardly against the interior wall 44 of the cavity, and is moved at the lower edge of its other side by the action of a screw bolt 45 inserted through a threaded hole in the exposed part of the plug element 40. By screwing the bolt inward, the lower part of the lock piece 43 is displaced inward across the bottom of the cavity 42 with the result that the upper part is brought up out of the cavity and is thereby pressed into firm contact with the inside of the profile tubing forming the bar 2 or 3. A simple and secure attachment of the rollers 9 is thereby achieved.

On both of the transverse frame elements 10, 11 there are provided, at the end located near the wheels in the frame's mounted position, catch levers 46 which automatically go into locking position when the rack 4 is shoved completely up between the bars 2, 3. The catch levers are spring-loaded by means of spring 47 and can rotate about a shaft journal 48 fastened to the frame elements 10, 11. As is apparent from the enlarged detail in FIG. 4, the catch levers 46 lock around the shaft journal 41 of the roller 9. As the rack frame 4 is shoved into place between the bars 2, 3, the catch lever 46 is automatically pressed downwards to the position indicated by the broken dotted lines in the enlarged detail, and snaps up to the position indicated by unbroken lines for a secure lock with the catch lever in engagement with the journal 41.

Having described my invention, I claim:

1. Combined car roof rack and two-wheel cart, comprising two bars adapted to be attached to the top of a car, so that they run in spaced parallel relationship to one another over the roof of the car transversely to its longitudinal direction, said bars being provided at one end with a rotatable roller, whose axis runs transversely to the longitudinal direction of the bar, and wherein a rectangular rack frame having at least one attachment bar for baggage, particularly a bicycle, is movably mounted between the bars, there being two opposing frame elements running parallel with and close up to the bars and consisting of metal lengths having a C-profile, with their profile openings facing respective bars and in engagement with the rollers thereof, characterized in that each of the two frame elements of C-profile are provided with easily mountable and dismountable service wheel devices, and that for the rack frame there is provided a shaft capable of being swung from a position folded in under the rack frame to a position extending from the end of the rack where the rollers are located, said shaft serving as a support leg for the rack frame when this has been drawn out over to the side of the vehicle and swung down along the vehicle's one side, each of the two service wheel devices consisting of a flexible, approximately U-shaped bar where the wheel is rotatably mounted on a shaft journal which is secured to the bar between the ends thereof, one end of the bar having a pin projecting at right angles to the main plane of the bar which is adapted for engagement with a complementary opening in the side of the rack frame, in particular in the open ends of two frame elements made of profile tubing which run transversely to the two frame elements of C-profile, and the other end of the bar having a slot opening upwardly and adapted to engage with the downwardly directed flange of the element of the C-profile when the service wheel devices are in mounted position.

2. Combined car roof rack and two-wheel cart according to claim 1, characterized in that the end of the bar having the open slot extends beyond the upper plane of the pin when the pin is engaged in the complementary opening but before the slot has been engaged with the flange of the C-profile element.

3. Combined car roof rack and two-wheel cart, comprising two bars adapted to be attached to the top of a car, so that they run in spaced parallel relationship to one another over the roof of the car transversely to its longitudinal direction, said bars being provided at one end thereof with a rotatable roller, whose axis runs transversely to the longitudinal direction of the bar, and wherein a rectangular rack frame having at least one attachment bar for baggage, particularly a bicycle, is movably mounted between the bars, there being two opposing frame elements running parallel with and close up to the bars and consisting of metal lengths having a C-profile, with their profile openings facing respective bars and in engagement with the rollers thereof, characterized in that the attachment bar for baggage, particularly a bicycle, consists of a U-shaped structure having two legs whereupon at the end of each leg and on the outside thereof there is provided a U-shaped track with its longitudinal direction transverse to the main plane of the attachment bar and with its opening facing outwards, that on each leg, near the end thereof, there is provided an arm whose one end is articulately connected to its respective leg and extends in between the legs, and at the inwardly directed end is articulately connected to the other such arm at a common joint, and that the angular rotation of the arms at their common joint is limited in one direction.

4. Combined car roof rack and two-wheel cart comprising two tubular bars adapted to be attached to the top of a car, so that they run in spaced parallel relationship to one another over the roof of the car transversely to its longitudinal direction, said bars being provided at one end with a rotatable roller, whose axis runs transversely to the longitudinal direction of the bar, and wherein a rectangular rack frame having at least one attachment bar for baggage, particularly a bicycle, is movably mounted between the bars, there being two opposing frame elements running parallel with and close to the bars and consisting of metal lengths having a C-profile with their profile openings facing their respective bars and in engagement with the rollers thereof, characterized in that the rollers are rotatably fastened about a shaft journal which is disposed at a right angle on a plug which is adapted for easily releasable attachment in the open end of each of the tubular bars, the end surface of the plug facing away from the tube end having a threaded hole into which is screwed a screw bolt whose interior tip is in contact with a loose lock piece resting at an angle, which lock piece is adapted to be moved by means of the screws at its interior end along the bottom of an outward opening cavity provided in the plug, and with the side surface thereof which faces away from the screw bolt resting against the interior limiting wall of the cavity.

* * * * *